US010454231B2

United States Patent
Bruhn et al.

(10) Patent No.: US 10,454,231 B2
(45) Date of Patent: Oct. 22, 2019

(54) BRUSH HOLDING DEVICE FOR A COMMUTATOR MACHINE

(71) Applicant: NIDEC MOTORS & ACTUATORS (GERMANY) GmbH, Bietigheim-Bissingen (DE)

(72) Inventors: Rainer Bruhn, Bietigheim-Bissingen (DE); Che sakre Bin Shamsol, Bietigheim-Bissingen (DE)

(73) Assignee: NIDEC MOTORS & ACTUATORS (GERMANY) GMBH, Bietigheim-Bissingen (DE)

( * ) Notice: Subject to any disclaimer, the term of this patent is extended or adjusted under 35 U.S.C. 154(b) by 93 days.

(21) Appl. No.: 15/311,037

(22) PCT Filed: May 15, 2015

(86) PCT No.: PCT/EP2015/060790
§ 371 (c)(1),
(2) Date: Nov. 14, 2016

(87) PCT Pub. No.: WO2015/173410
PCT Pub. Date: Nov. 19, 2015

(65) Prior Publication Data
US 2017/0085048 A1    Mar. 23, 2017

(30) Foreign Application Priority Data
May 16, 2014 (DE) .......... 10 2014 007 240

(51) Int. Cl.
*H02K 5/14* (2006.01)
*H01R 39/38* (2006.01)
(Continued)

(52) U.S. Cl.
CPC ............ *H01R 39/383* (2013.01); *H02K 5/148* (2013.01); *H02K 5/225* (2013.01); *H02K 11/026* (2013.01); *H02K 2213/03* (2013.01)

(58) Field of Classification Search
CPC ........ H02K 5/148; H02K 5/143; H02K 5/141; H02K 5/14; H02K 5/225; H02K 11/026;
(Continued)

(56) References Cited

U.S. PATENT DOCUMENTS 5,196,750 A   3/1993 Strobl
5,749,737 A   5/1998 Zuin
(Continued)

FOREIGN PATENT DOCUMENTS

CN   101882837 A   11/2010
CN   102255439 A   11/2011
(Continued)

OTHER PUBLICATIONS

Written Opinion of the International Searching Authority, PCT/EP2015/060790; dated Nov. 22, 2016.
(Continued)

*Primary Examiner* — Nguyen Tran
*Assistant Examiner* — Bryan R Perez
(74) *Attorney, Agent, or Firm* — Cantor Colburn LLP

(57) ABSTRACT

A brush holding device may include a brush holder; a plug; a first plug contact element and a second plug contact element; and a first circuit board. The first plug contact element and the second plug contact element may be connected with a brush through a choke coil. The first circuit board may include electric-magnetic interference suppression components connected to a first and second contact area of the first circuit board. The electric-magnetic interference suppression components may be electrically connected to the first contact area and the second contact area, and the
(Continued)

electric-magnetic interference suppression components may be directly or indirectly grounded.

11 Claims, 11 Drawing Sheets

(51) Int. Cl.
  *H02K 11/026* (2016.01)
  *H02K 5/22* (2006.01)
(58) Field of Classification Search
  CPC .... H02K 11/024; H01R 39/383; H01R 39/38; H01R 39/36; H01R 39/41
  USPC .......................... 310/239, 238, 242, 245, 249
  See application file for complete search history.

(56) References Cited

U.S. PATENT DOCUMENTS

| | | | |
|---|---|---|---|
| 6,201,326 B1 | 3/2001 | Klappenbach et al. | |
| 6,291,914 B1 | 9/2001 | Mukaiyama | |
| 6,448,676 B1 | 9/2002 | Kershaw et al. | |
| 7,042,122 B1 | 5/2006 | Dufala et al. | |
| 2003/0107293 A1 | 6/2003 | Frey et al. | |
| 2004/0245885 A1 | 12/2004 | Bruhn et al. | |
| 2006/0208586 A1* | 9/2006 | Guttenberger | H02K 5/148 310/71 |
| 2006/0208588 A1 | 9/2006 | Guttenberger | |
| 2007/0170789 A1 | 7/2007 | Kawarai et al. | |
| 2008/0203833 A1 | 8/2008 | Mizutani | |
| 2009/0001829 A1 | 1/2009 | Uchimura et al. | |
| 2009/0255186 A1 | 10/2009 | Uchimura | |
| 2010/0026114 A1* | 2/2010 | Keller | H02K 5/148 310/71 |
| 2010/0283339 A1 | 11/2010 | Kitai | |
| 2012/0175980 A1 | 7/2012 | Zhang et al. | |
| 2013/0004196 A1 | 1/2013 | Nagasaki et al. | |
| 2013/0285492 A1 | 10/2013 | Ozaki et al. | |
| 2014/0183987 A1* | 7/2014 | Sekii | H02K 5/225 310/52 |
| 2015/0288245 A1* | 10/2015 | Maerkle | H02K 5/225 310/71 |
| 2016/0204681 A1 | 7/2016 | Saitou et al. | |

FOREIGN PATENT DOCUMENTS

| | | |
|---|---|---|
| CN | 102593997 A | 7/2012 |
| CN | 202444361 U | 9/2012 |
| CN | 103797694 A | 5/2014 |
| DE | 19517667 A1 | 11/1996 |
| DE | 102005055740 A1 | 6/2006 |
| DE | 102008053573 A1 | 4/2010 |
| EP | 1531528 A1 | 5/2005 |
| JP | H1118353 A | 1/1999 |
| JP | 2009268279 A | 11/2009 |
| JP | 2013248519 A | 12/2013 |
| WO | 2006015914 A1 | 2/2006 |
| WO | 2007141249 A1 | 12/2007 |

OTHER PUBLICATIONS

SIPO First Office Action corresponding to Application No. 201580026526.X; dated May 31, 2018.
CNOA Second Office Action corresponding to Application No. 201580025968.2; dated Jan. 30, 2019.
CNOA Second Office Action corresponding to Application No. 201580025976.7; dated Jan. 30, 2019.
SIPO First Office Action corresponding to Application No. 201580025968.2; dated May 3, 2018.
USPTO Non-Final Office Action corresponding to U.S. Appl. No. 15/311,051; dated Nov. 5, 2018.
USPTO Notice of Publication for U.S. Appl. No. 15/311,007; Publication No. 2017-0093245A1; dated Mar. 30, 2017.
USPTO Notice of Publication for U.S. Appl. No. 15/311,051; Publication No. 2017-0085150A1; dated Mar. 23, 2017.
Written Opinion of the International Searching Authority corresponding to Application No. PCT/EP2015/060803; dated Nov. 22, 2016.
Written Opinion of the International Searching Authority corresponding to Application No. PCT/EP2015/060799; dated Nov. 22, 2016.
JPO Notice of Reasons for Rejection corresponding to Application No. 2017-512443; Dated Apr. 16, 2019.
USPTO Non-Final Office Action corresponding to U.S. Appl. No. 15/311,007; Dated Jun. 11, 2019.

* cited by examiner

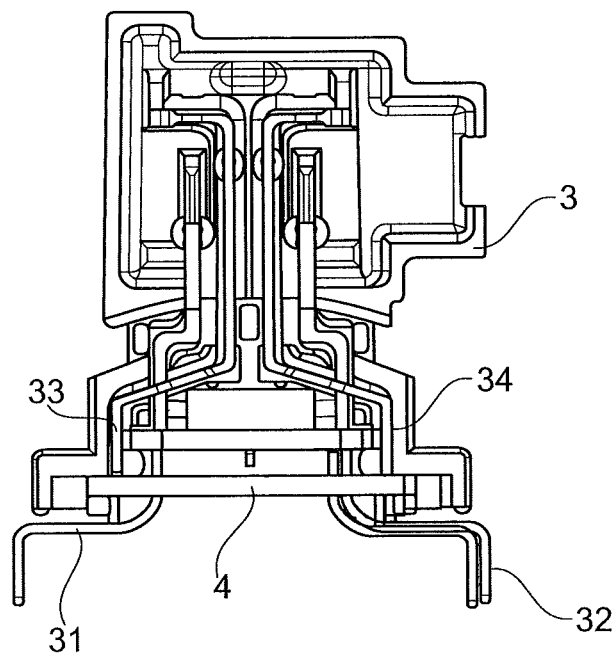
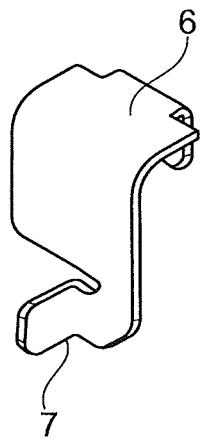
Fig. 3B
Fig. 6
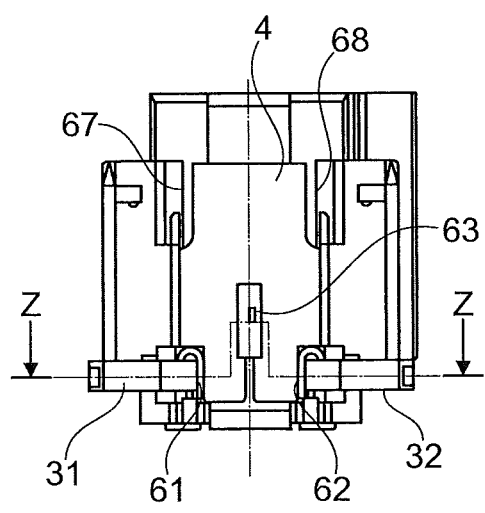
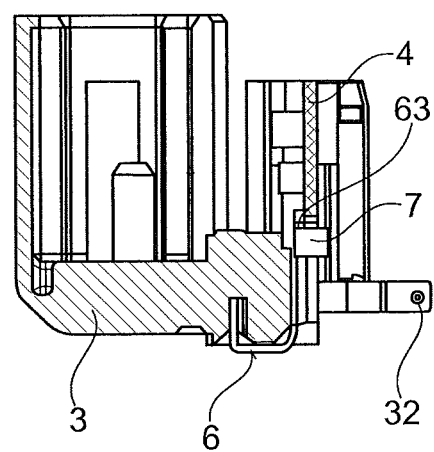
Fig. 4
Fig. 5

Section Z - Z

BRUSH HOLDING DEVICE FOR A COMMUTATOR MACHINE

CROSS REFERENCE TO RELATED APPLICATIONS

This is the U.S. national stage of application No. PCT/EP2015/060790, filed on May 15, 2015. Priority under 35 U.S.C. § 119(a) and 35 U.S.C. § 365(b) is claimed from German Application No. 10 2014 007 240.1, filed May 16, 2014, the disclosure of which is incorporated herein by reference.

FIELD OF INVENTION

At least an embodiment of the invention relates to a brush holding device comprising a brush holder, the brush holder comprising at least two brush tubes for holding carbon brushes and a plug to be attached to the brush holder. At least an embodiment of the invention further relates to a motor comprising a brush holding device. At least an embodiment of the invention also relates to a motor comprising a brush holding device and two circuit boards.

BACKGROUND

Caused by sparking at the brushes, commutator machines are known to disseminate strong radio noise fields. As nowadays cars are equipped with sensitive electronic sensors and microprocessors, which are sensitive to noise signals on supply voltages and radio fields the suppression of such noise signals have become more and more important. When an electric current that drives a motor flows through an electrode, electromagnetic noise is generated. The electromagnetic noise is electromagnetic interference (EMI) and interferes with other electronic equipment, thereby causing malfunction. In recent car models, a lot of electronic equipments are used and in order to prevent malfunction due to electromagnetic interference, improvement in characteristic for the electromagnetic interference prevention in a motor is required. In order to cope with this problem it is known to use EMI suppression elements at appropriate locations. As voltage supply wires and signal wires have to enter or leave the motor the shield of a completely shielded electric motor is vulnerable by little openings.

In order to keep the openings as small as possible it is known to guide wires into the electric motor by feed through capacitors.

The use of feed through capacitors however is a relative costly solution.

Additionally, a sensor magnet is directly or indirectly fixed to a shaft. Since the shaft slightly moves in an axial direction, the sensor magnet also moves in the axial direction. In a case where a sheet of circuit board is used, a distance as far as a magnetic pole sensor increases. For this reason, a detection error width increases.

The detection error width can be reduced by aligning the axial heights of the sensor magnet and the magnetic pole sensor. However, in this case, the magnetic pole sensor is disposed at the center of the circuit board, and thus it is not possible to dispose electronic components for EMC measures together. Therefore, in a case where it is not possible to dispose the electronic components for EMC measures together, since a wiring in the circuit board becomes longer, electromagnetic noise is easily generated, and thus it is not preferable.

SUMMARY

At least an embodiment of the present invention reduces the detection error width of a magnetic pole sensor while improving EMI prevention performances.

At least an embodiment of the present invention provides an electric motor with sufficient protection against electromagnetic interfering fields and to avoid at the same time costly electric elements. At least an embodiment of the present invention improves the characteristic for electromagnetic interference prevention in a motor.

To this aim, at least an embodiment of the present invention proposes a brush holding device comprising: a brush holder; a plug extending radially outward from the brush holder; a first plug contact element and a second plug contact element that are fixed to the plug and extend toward the brush holder; and a first circuit board having a first contact area and a second contact area. The first plug contact element and the second plug contact element are connected with a brush through a choke coil, and the first plug contact element and the second plug contact element are made of an electrically conductive material and supply electric power to the brush. The first contact area has a first slit and the second contact area has a second slit. The first circuit board is inserted into the first plug contact element and the second plug contact element, wherein the first plug contact element and the second plug contact element are respectively accommodated in the first slit and the second slit. The first contact area and the second contact area are electrically connected to the first plug contact element and the second plug contact element by solder or welding. The first circuit board has electric-magnetic interference suppression components, wherein the electric-magnetic interference suppression components are electrically connected to the first contact area and the second contact area, and the electric-magnetic interference suppression components are directly or indirectly grounded.

With the first and second slits of the printed circuit board it is possible to arrange the printed circuit board perpendicular to the plane in which the plug contact elements extend to the brush holder. Effectively the plug contact elements and the top surface of the brush holder are in the same or almost the same plane. With this arrangement the design of the brush holding device is not affected by the circuit board, as the circuit board is arranged at the periphery of the brush holder and extends perpendicular from the plane of the brush holder. As there is no need to extend the plug contact elements in order to receive the printed board, the length of the plug contact elements must not to be changed so that the plug contact elements are kept as short as possible.

The first plug contact element and the second plug contact element are connected with a brush through a choke coil.

According to at least an embodiment of the present invention, the first plug contact element and the second plug contact element are grounded through the electric-magnetic interference suppression components. The electromagnetic noise which is generated from the first plug contact element and the second plug contact element is removed by the electric-magnetic interference suppression components. It is therefore possible to reduce electromagnetic noise which is generated from an electrode.

In at least an embodiment of the invention a width of the first slit and a width of the second slit, each, is bigger than a thickness of the first plug contact element and a thickness of the second plug contact element, each, and the first plug contact element and the second plug contact element are respectively fixed to the first slit and the second slit. Advantageously the contact between a circuit board and an electrode is stable and electromagnetic noise is not easily generated.

A circuit board may also be press-fitted to an electrode. The slits may be inserted into the plugs. The slits may be press-fitted to the plug.

In at least an embodiment of the invention the first circuit board has a plate shape, wherein the first circuit board extends perpendicular to the brush holder and in an axial direction, and the first slit and the second slit are located at end portions in the axial direction of the first circuit board.

This aspect provides an easy insertion of the first circuit board into the electrode.

The first slit and the second slit, each, may have a shape obtained by cutting out a lower end portion of the first circuit board.

In at least an embodiment of the invention the first contact area has a first land portion that is formed of copper foil, wherein the first land portion surrounds the first slit, the second contact area has a second land portion that is formed of copper foil, and the second land portion surrounds the second slit. By providing a land portion disposed so as to surround the electrode, the electrode and the land portion being in a conduction state, the contact area between the electrode and the land portion is widened. Thus, generation of electromagnetic noise may be suppressed.

By providing the plug with a circuit board accommodation portion, extending in the axial direction from the plug and surrounding an edge of the first circuit board, the first circuit board may be retained stably. As such, the contact with the electrode is stable, and thus, electromagnetic noise is not easily generated.

Preferably, the circuit board accommodation portion extends in a circumferential direction while facing upward axially. The circuit board accommodation portion guides the first circuit board. As such, it becomes easy to insert the first circuit board into the electrode.

In at least an embodiment of the invention the first plug contact element has a first press-fitting portion, the second plug contact element has a second press-fitting portion, and the first press-fitting portion and the second press-fitting portion are press-fitted and fixed to the plug.

In at least an embodiment of the invention, the brush holding device further comprises a member for ground, wherein the member for ground is located on a lower surface of the plug, wherein the first circuit board has a third slit and a third land portion, wherein the member for ground has a conduction portion that is electrically connected with the third land portion by solder or welding. The first land portion, the second land portion, and the third land portion are respectively electrically connected. Advantageously, the member for ground comes into contact with another metal member, thereby grounding the first circuit board.

In at least an embodiment of the invention, the brush holding device further comprises a member for ground, wherein the member for ground is located on an upper surface of the plug wherein the first circuit board has a third slit and a third land portion, wherein the member for ground has a conduction portion that is electrically connected with the third land portion by solder or welding. The first land portion, the second land portion, and the third land portion are respectively electrically connected. Advantageously, the member for ground comes into contact with another metal member, thereby grounding the first circuit board. As a result, electromagnetic noise flowing through the electrode can be removed by the electric-magnetic interference suppression components.

As the printed circuit board is arranged perpendicular to the plane of the plug contact elements the electro-magnetic interference suppression components (EMI suppression components) can be placed very close to the plug contact elements. This minimizes parasitic impedances, which would be introduced in case the electro-magnetic interference suppression components would be connected with wires. With the use of a printed circuit board the electromagnetic interference suppression components can be chosen as SMD components which are directly soldered to the printed circuit board without any connecting wires. As the routing of the conductors on the printed circuit board allows extremely short connections from interference suppression capacitor to the plug contact elements the interference waves experience a very low resistance and can advance very well to the interference suppression capacitor. In this way the interference suppression capacitor is enabled to provide its full function as a filtering element. With this embodiment of the invention, electric commutator machine is enabled to meet the high requirements of the car industry for electromagnetic compatibility by avoiding the use of feed through capacitors.

The member for ground may be a sheet-metal grounding plate. The sheet-metal grounding plate can be attached, such that after mounting the brush holding device to an electrically conductive machine housing the metal grounding plate electrically connects to the electrically conductive machine housing.

The sheet-metal grounding plate provides a large connecting area to the metallic machine housing of the commutator machine.

In this manner a central ground area is achieved very close to the completely shielded machine housing such that compensation currents are kept low. In that way the EMI suppression components on the printed circuit board are placed very closely to this central ground area and are enabled to perform satisfactorily.

At least an embodiment of the present invention also proposes a motor comprising: a rotating section; and a stationary section, wherein the rotating section has a shaft, a rotor core fixed to the shaft, and a coil wound around the rotor core. The stationary section has a brush holding device, a housing covering a portion of the brush holding device, a magnet fixed to a housing inside, and a bearing that is retained in the housing and supports the shaft. A first circuit board is retained by the brush holding device. The housing has a cylindrical portion, a lid portion, and a bottom portion. The brush holding device has a brush holder, a plug extending radially outward from the brush holder, a first plug contact element and a second plug contact element extending from the plug to the brush holder, and at least two brushes that are respectively connected to the first plug contact element and the second plug contact element. The cylindrical portion of the housing has a through-hole penetrating in a radial direction. The plug is exposed to the outside through the through-hole, and ends in an axial direction of the brush holder are covered by the lid portion and the bottom portion of the housing.

According to at least an embodiment of the present invention, an opening portion of the housing is the only portion where the plug is exposed. Therefore, it is possible to make the through-hole of the housing small. As such, the emission of electromagnetic waves at the time of the driving of the motor is reduced.

The cylindrical portion, the bottom portion, and the lid portion of the housing may be formed of a plurality of members or may be formed of a single member.

In at least an embodiment of the invention, the first circuit board extends in the axial direction along the cylindrical portion of the housing, wherein the first circuit board has copper foil along a direction in which a plate spreads. An area of a site where the copper foil exists, in the first circuit board, is larger than an area of a site where the copper foil does not exist, and the through-hole and the first circuit board overlap in the radial direction. Since a land portion of the first circuit board is made of copper foil, a state is created where an opening of the housing is closed with metal. As such, it is possible to prevent the emission of electromagnetic waves.

A site where the copper foil exists refers to where the copper foil is present in any of the front and back or the inside, and a site where the copper foil does not exist refers to where the copper foil is not present in any of the front and back and the inside.

In at least an embodiment of the invention, the first circuit board is retained by the brush holding device, extends in the axial direction along an outer peripheral surface of the housing, and has the copper foil along a direction in which a plate spreads. The copper foil of the first circuit board is located on an imaginary line connecting a tip of any brush and the through-hole.

Advantageously, when the brush is sparked, electromagnetic noise is generated from the tip of the brush. At this time, in a configuration in which the copper foil of the first circuit board is located on an imaginary line connecting a tip of any brush and the through-hole, the electromagnetic noise is attenuated by the copper foil. As such, it is possible to suppress the emission of the electromagnetic noise.

In at least an embodiment of the invention, an upper end of the first circuit board is located further on the upper side in the axial direction than a lower end of the through-hole of the housing. By providing the first circuit board in a positional relationship to close the opening of the housing, the emission of electromagnetic waves is further prevented.

In at least an embodiment of the invention, a height dimension in the axial direction of the first circuit board is larger than a height dimension in the axial direction of the through-hole of the housing. In at least an embodiment of the invention, a width dimension in a circumferential direction of the first circuit board is larger than a width dimension in the circumferential direction of the through-hole of the housing. The first circuit board can therefore close the opening of the housing. A gap of the opening can be reduced to the maximum extent.

By providing a position of a lower end of the first circuit board located further to the lower side in the axial direction than a position of a lower end of the through-hole of the housing, the first circuit board can close the opening of the housing. Further, the axial length of the motor can be made shorter.

In at least an embodiment of the invention, the first circuit board is located inside the cylindrical portion of the housing, and the first circuit board is located radially outside the brush holder. Alternately, the brush holder may be located inside the cylindrical portion of the housing, and the first circuit board may be located radially inside the brush holder.

In at least an embodiment of the invention, a first circuit board is retained by the brush holding device, the first circuit board extends substantially vertically and in a radial direction along the cylindrical portion of the housing, the stationary section further has a plug member, and the plug member is fixed to the housing and overlaps the through-hole of the housing in the radial direction.

In at least an embodiment of the invention, a first circuit board has a first contact area and a second contact area, the first contact area has a first slit and the second contact area has a second slit. The first circuit board is inserted into the first plug contact element and the second plug contact element. The first plug contact element and the second plug contact element are respectively accommodated in the first slit and the second slit, are connected with the brush through a choke coil, and are made of an electrically conductive material and supply electric power to the brush. The first contact area and the second contact area are electrically connected to the first plug contact element and the second plug contact element by solder or welding, and the first circuit board has electric-magnetic interference suppression components, wherein the electric-magnetic interference suppression components are electrically connected with the first contact and second contact areas. The brush holding device further has a member for ground, fixed to a lower surface of the plug. The first circuit board has a third slit and a third land portion, the member for ground having a conduction portion that is electrically connected with the third land portion by solder or welding, and a first land portion, a second land portion, and the third land portion are respectively electrically connected.

Advantageously the member for ground comes into contact with the housing, thereby grounding the first circuit board. As a result, electromagnetic noise flowing through the electrode can be removed by the electric-magnetic interference suppression components In at least an embodiment of the invention, a lower surface of the member for ground comes into contact with the bottom portion of the housing.

At least an embodiment of the invention also proposes a motor comprising a rotating section; and a stationary section, wherein the rotating section has a shaft, a rotor core fixed to the shaft, a coil wound around the rotor core, and a sensor magnet fixed to the shaft, and wherein the stationary section has a brush holding device, a housing covering a portion of the brush holding device, a magnet fixed inside the housing, a bearing that is retained in the housing and supports the shaft, a first circuit board having a plate shape and extending in an axial direction, and a second circuit board having a plate shape and extending in the axial direction. The housing has a cylindrical portion, a lid portion, and a bottom portion. The brush holding device has a brush holder, a plug extending radially outward from the brush holder, a first plug contact element and a second plug contact element extending from the plug to the brush holder, the first circuit board, a choke coil, and a brush. The first circuit board is connected to the first plug contact element and the second plug contact element. The first plug contact element and the second plug contact element are connected with the brush through the choke coil, and are made of an electrically conductive material and supply electric power to the brush. The first circuit board has electric-magnetic interference suppression components, and the second circuit board has a magnetic pole sensor that detects a magnetic pole of the sensor magnet. The second circuit board is located radially inside the first circuit board and the magnetic pole sensor of the second circuit board faces the sensor magnet in a radial direction.

At least an embodiment of the invention therefore proposes using two sheets of circuit boards. The axial height of the circuit board can therefore be shortened. Thus, it is possible to reduce the axial length of the motor.

Further, by separating the circuit board for EMI measures and the circuit board with the magnetic pole sensor mounted thereon, it is possible to suppress the influence of electromagnetic noise on the magnetic pole sensor.

In addition, by locating the second circuit board radially inside, the sensor magnet can be detected with high degree of accuracy.

In at least an embodiment of the invention, the stationary section further has a third plug contact element and a fourth plug contact element extending toward the brush holder, the second circuit board has a plurality of drill holes, and the third plug contact element and the fourth plug contact element are electrically connected with the drill holes by solder or welding. Accordingly, the third plug contact element and the fourth plug contact element may read the output of the magnetic pole sensor and thus detect the rotation angle of a rotor.

A fifth plug contact element may be provided as well.

In at least an embodiment of the invention the plug has a circuit board fixing portion, and the circuit board fixing portion retains the second circuit board.

In at least an embodiment of the invention, the second circuit board is located between the first plug contact element and the second plug contact element.

In at least an embodiment of the invention the first circuit board is located between a third plug contact element and a fourth plug contact element.

The first circuit board may have a fourth slit and a fifth slit, and a third plug contact element and a fourth plug contact element pass through the fourth slit and the fifth slit.

In at least an embodiment of the invention the further printed circuit board comprises a pulse sensor, such as a hall sensor. With a pulse sensor as an input element speed and power of the commutator machine can be controlled.

By the arrangement of the printed circuit board between the EMI suppression component and the brush holder sensor which is mounted to the further printed circuit board can be placed very closely to the magnetic rotating field of the commutator machine. Despite the EMI suppression components and the sensor this arrangement is compact and connects the components such that they cannot be lost. This makes it easier to fix the plug to the machine housing. Thus a ZUS plug contact element is created which comprises all necessary connections.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3B is a view of a plug arranged with a first circuit board according to at least an embodiment of the present invention, FIG. 4 is a front view of a plug which can be used a brush holding device according to at least an embodiment of the present invention, FIG. 5 is a cross-section view of the plug of FIG. 4, FIG. 6 is an isometric view of a member for ground which can be used with the plug of FIG. 4.

DETAILED DESCRIPTION

Figure 1:
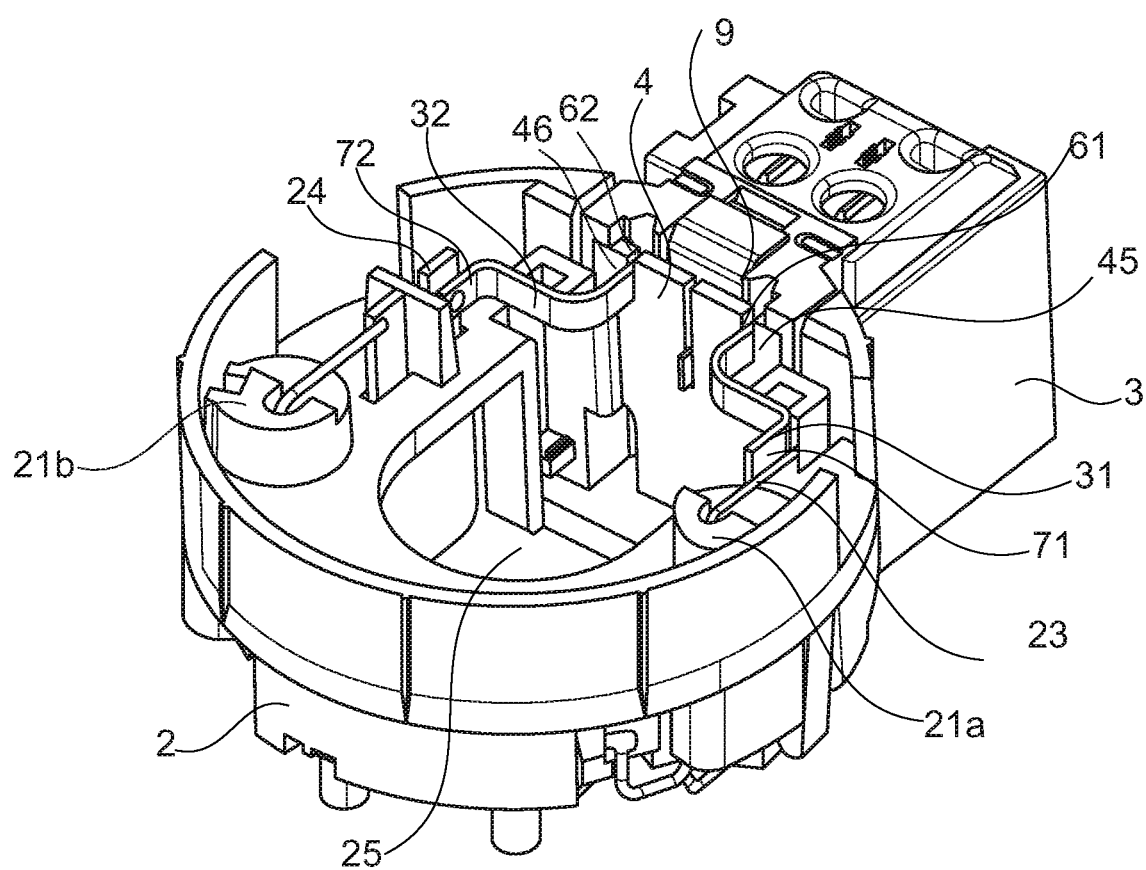
FIG. 1 is an isometric view of a brush holding device according to at least an embodiment of the present invention.
Figure 2:
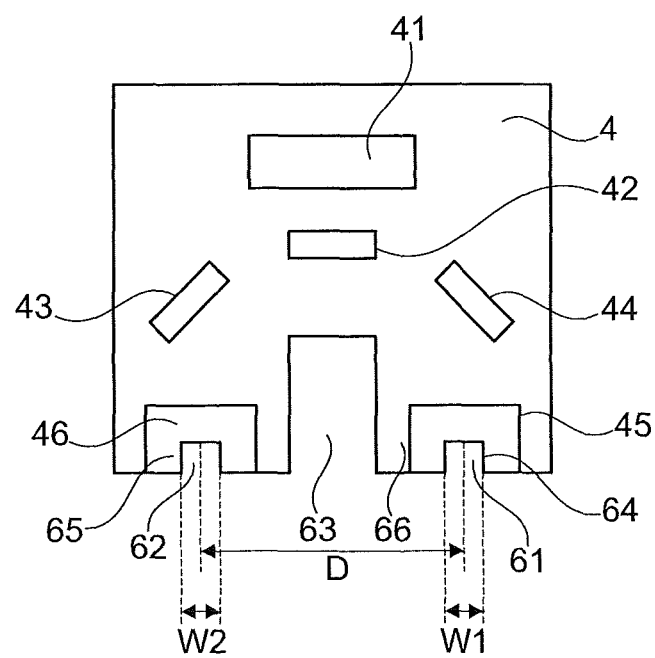
FIG. 2 is a first circuit board which can be used a brush holding device according to at least an embodiment of the present invention.

To give a general overview the brush holding device is presented at first in its final assembled state. FIG. 1 shows the brush holding device 1 in a perspective bird's eye view. The brush holding device 1 forms part of a not shown direct current electro motor (DC motor). DC motors are widely used for example in cars for window operating mechanisms or windscreen wipers.

FIG. 1 is an isometric view of a brush holding device 1 according to at least an embodiment of the present invention. Different aspects or features of the brush holding device 1 are shown on the FIGS. 1 to 11.

The brush holding device 1 comprises a brush holder 2, a plug 3, a first printed circuit board 4.

The brush holder 2 comprises two cylindrical choke coil holding tube portions 21a and 21b to hold a choke coil, respectively. Each choke coil is connected to a respective brush, usually inserted in a corresponding brush tube arranged in proximity to the choke coil. Commonly DC electro motors use two brushes, however DC electro motors with more than two brushes also exist. The carbon brushes are not visible in the perspective view of FIG. 1 as they are inserted into the two brush tubes from the bottom side of the brush holder 2.

The plug 3 extends radially outward from the brush holder 2. A first plug contact element 31 and a second plug contact element 32 are fixed to the plug 3 and extend toward the brush holder 2. The first plug contact element 31 and the second plug contact element 32 are made of an electrically conductive material, typically metallic inserts, and are adapted to supply electric power to a brush.

The first plug contact element 31 has a first contact tab 71 and the second plug contact element 32 has a second contact tab 72, which are adapted to be welded or soldered to a first carbon lead 23 and a second carbon lead 24.

Figure 7:
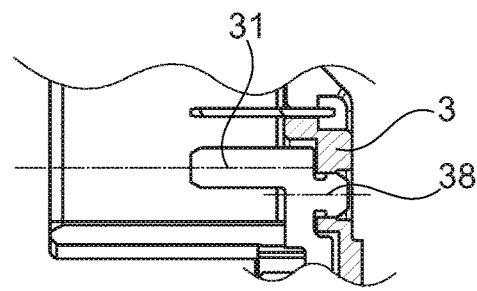
FIG. 7 is a detailed view of a first plug contact element which can be used a brush holding device according to at least an embodiment of the present invention
Figure 8:
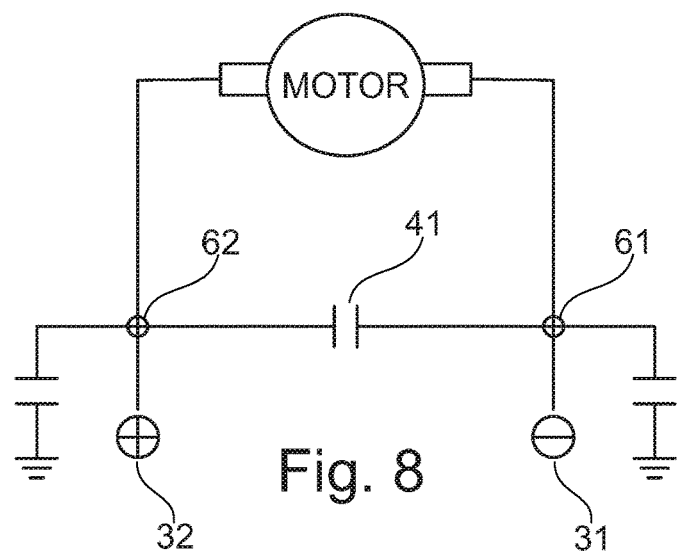
FIG. 8 is a schematic diagram of a circuit of a brush holding device according to at least an embodiment of the present invention

The first plug contact element 31 and the second plug contact element 32 are fixed to the plug 3 by means of a first press-fitting portion and a second press-fitting portion, respectively, which are press-fitted to the plug 3. A detailed view of a first plug contact element 31 with the first press-fitting portion 38 is shown in FIG. 7. The second plug press fitting portion is identical to the first press fitting portion.

Figure 3A:
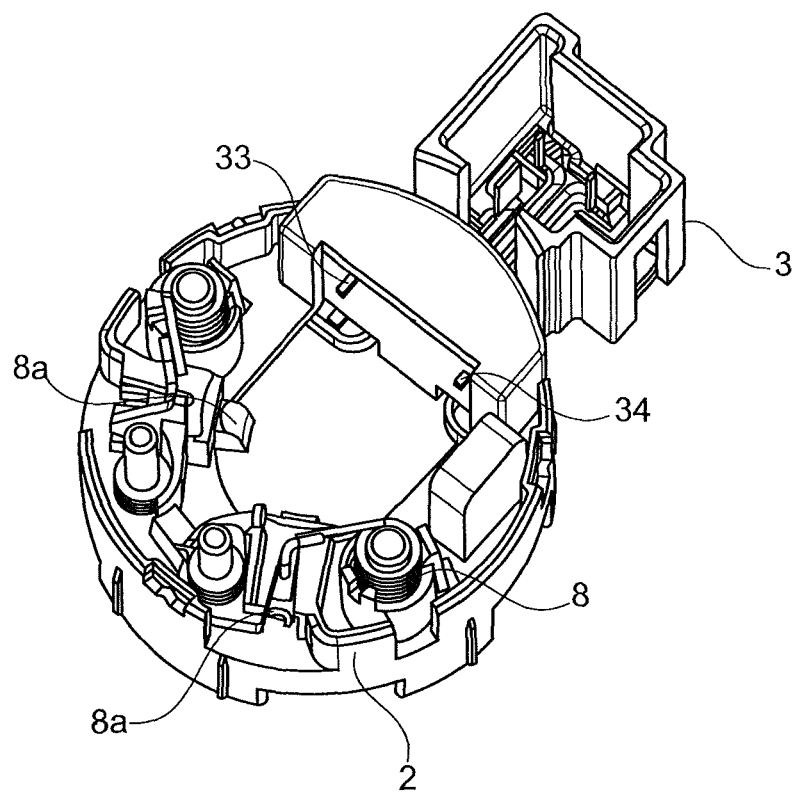
FIG. 3A is an isometric view of a brush holding device according to at least an embodiment of the present invention.

The first plug contact element 31 and the second plug contact element 32 are connected with a brush 8a through a choke coil 8, which is best seen on FIG. 3A.

A third contact element 33 and a fourth contact element 34 are also provided, as best seen on FIGS. 3A, 3B.

The first plug contact element 31 and the second plug contact element 32 may be connected with a choke coil 8 or a brush 8a through another member.

The plug 3 has a circuit board accommodation portion 9, extending in the axial direction from the plug 3 and surrounding an edge of the first circuit board 4, and more precisely extending in a circumferential direction while facing upward axially.

The first circuit board 4 is inserted into the first plug contact element 31 and the second plug contact element 32. As best seen on FIGS. 1, 2, 4 to 6, the first circuit board 4 has a first contact area 45 and a second contact area 46. The first contact area 45 has a first slit 61 and the second contact area 46 has a second slit 62, adapted to accommodate the first plug contact element 31 and the second plug contact element 32 respectively.

The first slit 61 and the second slit 62 each has a shape obtained from cutting out a lower end portion of the first circuit board 4.

An electrical connection between the first contact area 45 and the first plug contact element 31, respectively the second contact area 46 and the second plug contact element 32 is achieved by solder or welding.

The first contact area 45 has a first land portion 64 surrounding the first slit 61. Similarly, the second contact area 46 has a second land portion 65 surrounding the second slit. The first and second land portions 64, 65 are formed of copper foil.

The first circuit board 4 has a third slit 63, centrally located between the first and second slits 61, 62, and a third land portion 66 surrounding the third slit 63.

The first land portion 64, the second land portion 65, and the third land portion 66 are respectively electrically connected. A member for ground 6 in a form of a sheet-metal grounding plate has a conduction portion that is electrically connected with the third land portion by solder or welding, as seen on FIG. 6.

Figure 9:
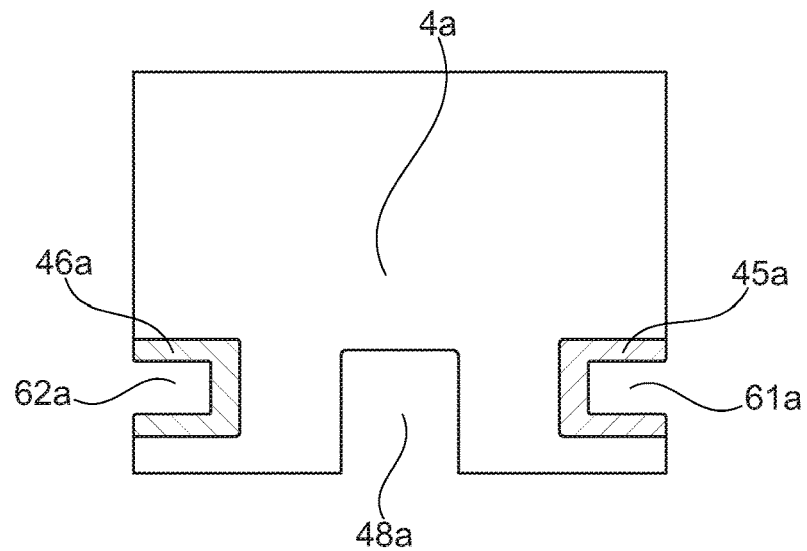
FIG. 9 is an example of slits which can be used with a brush holding device according to at least an embodiment of the present invention.

The first and second slits 61, 62 are located at end portions in the axial direction of the first circuit board 4 in the described embodiment. However this is not limiting the invention and the first and second slits 61, 62 may be located at end portions in the radial direction, as shown in FIG. 9 showing a circuit board 4a having a first contact area 45 with a first slit 61a and the second contact area 46a has a second slit 62a, adapted to accommodate the first plug contact element 31 and the second plug contact element 32 respectively.

The sheet-metal grounding plate 6 provides a contact tab 7 which is inserted to the third slit 48 of the printed circuit board 4 when the sheet-metal grounding plate 6 is mounted to the brush holder device 1. This arrangement allows a short connection between ground connector and machine housing via the sheet-metal grounding plate 6. In this manner a central ground area is achieved very close to the completely shielded machine housing such that compensation currents are kept low. In that way the EMI suppression components on the printed circuit board are placed very closely to this central ground area and are enabled to achieve good performances.

Preferably a width W1 of the first slit 61 is bigger than a thickness of the first plug contact element 31, and a width W2 of the second slit 62 is bigger than a thickness of the second plug contact element 32. In this way, when the first slit 61 is inserted onto the first plug contact element 31 and the second slit 62 is inserted onto second plug contact element 32, the first slit 61 clamps to the first plug contact element 31 and the second slit 62 clamps to the second plug contact element 32.

The first circuit board 4 has a fourth slit 67 and a fifth slit 68.

The first circuit board 4 has electric components 41, 42, 43, 44, as electric-magnetic interference suppression components 41, 42, 43, 44, electrically connected to the first contact area 45 and the second contact area 46. The electric-magnetic interference suppression components 41, 42, 43, 44 are directly or indirectly grounded.

The brush holding device 1 can be formed by attaching the plug 3 to the brush holder 2. Precisely, the brush holder 2 is slid onto the assembled plug 3, thereby attaching the plug 3 to the periphery of the brush holder 2. The plug 3 extends radially outwards of the periphery of the brush holder 2 in respect to a central opening 25 of the brush holder 2. The plug 3 and the brush holder 2 are provided with corresponding snap-in locking elements for achieving a solid assembly.

Figure 10:
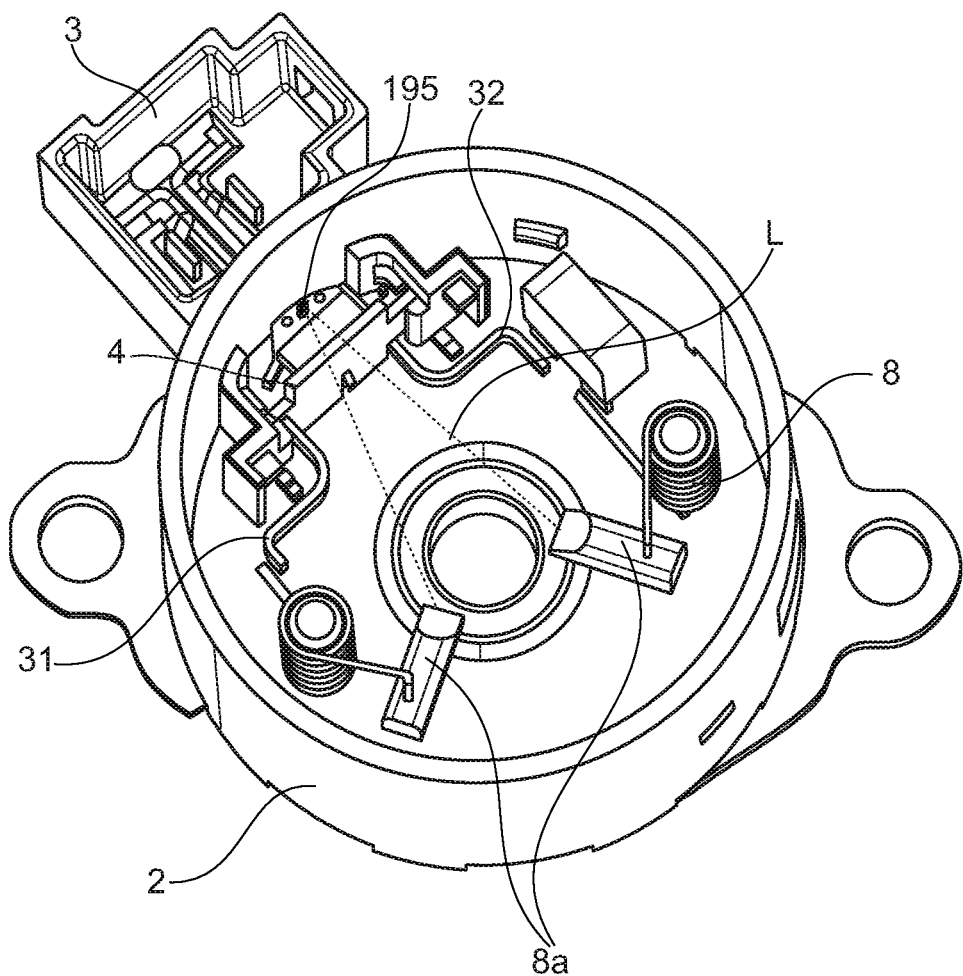
FIG. 10 is a rear view of the brush holding device of FIG. 1.
Figure 12:
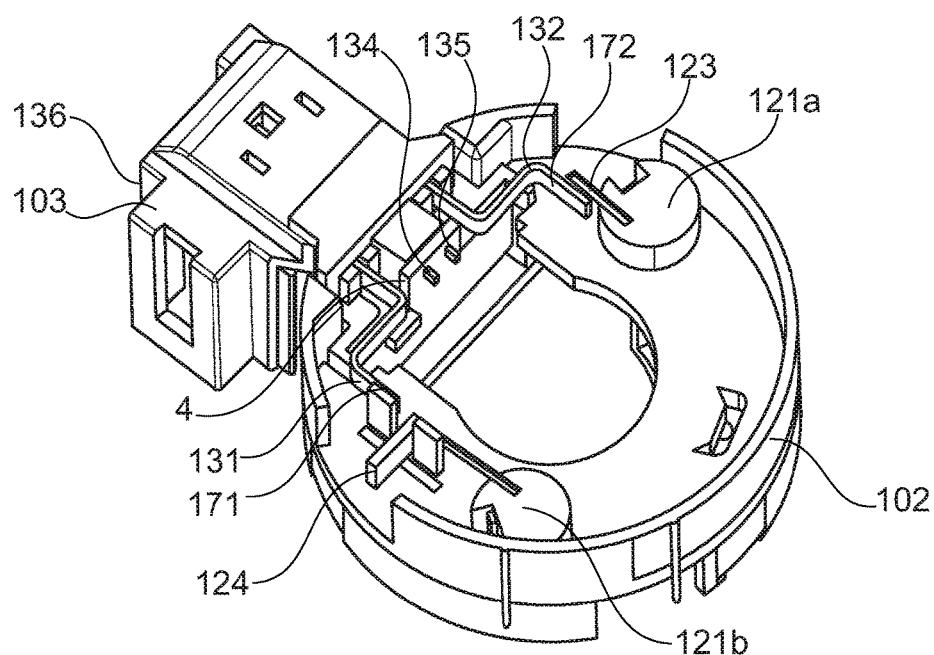
FIG. 12 is an isometric view of a brush holding device according to at least an embodiment of the present invention

As seen on FIGS. 10 and 12, the brush holder 2 is located inside the cylindrical portion of the housing, and the first circuit board 4 is located radially inside the brush holder 2. In an alternate embodiment, the first circuit board 4 may be located radially inside the brush holder 2.

A first carbon lead 23 can be soldered or welded to the first contact tab 71 and a second carbon lead 24 to the second contact tab 72.

Figure 11:
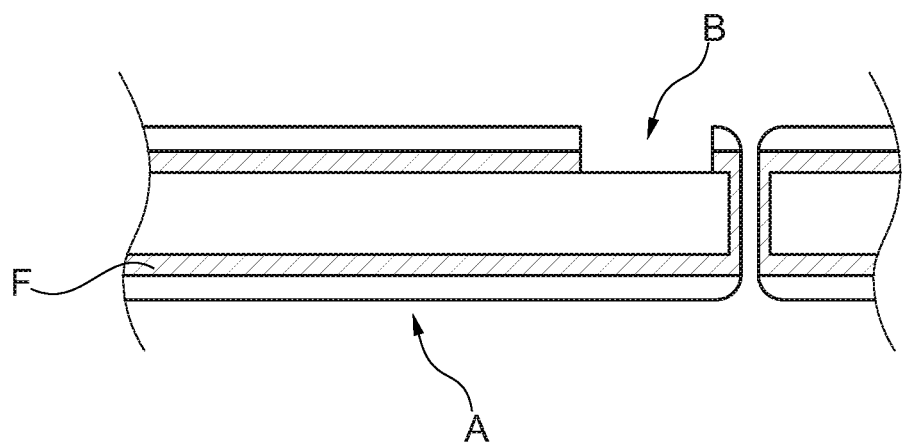
FIG. 11 is a cross section of a circuit board in a brush holding device of FIG. 1.

As can be seen on FIG. 11, the first circuit board has a copper foil F along a direction in which a plate spreads. An area of a site A where the copper foil exists, in the first circuit board (4), is larger than an area of a site B where the copper foil does not exist. The copper foil F is located on an imaginary line L connecting a tip of any brush 8a and the through-hole 195, when the brush holding device is assembled within the motor 180.

Figure 13:
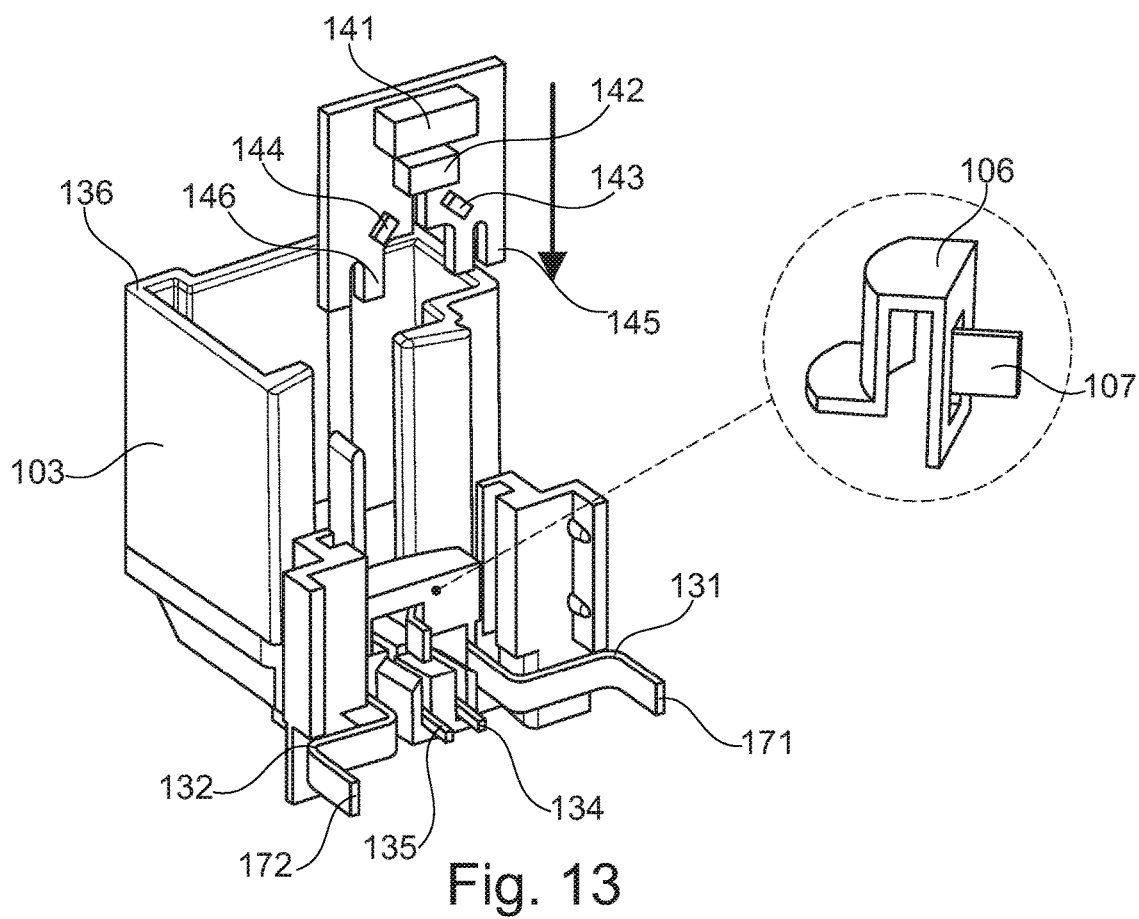
FIG. 13 is the brush holding device of FIG. 10 in a first assembly stage according to at least an embodiment of the present invention.

FIG. 12 is an isometric view of a brush holding device 101 according to at least an embodiment of the present invention and FIG. 13 shows the brush holding device 101 in a first assembly stage according to at least an embodiment of the present invention The brush holding device 100 comprises a brush holder 102, a plug 103, a first printed circuit board 104.

The brush holder 102 comprises two cylindrical choke coil holding tube portions 121a and 121b to hold a choke coil, respectively. Each choke coil is connected to a respective brush, usually inserted in a corresponding brush tube arranged in proximity to the choke coil.

Commonly DC electro motors use two brushes, however DC electro motors with more than two brushes exist also. The carbon brushes are not visible in the perspective view of FIG. 12 as they are inserted into the two brush tubes from the bottom side of the brush holder 102.

The shape of the brush holder 102 matches the surface of a not shown stator housing of the electric motor. The brush holding device 101 and the motor comprise corresponding snap-in locking means for connecting the brush holding device 1 to the stator housing of the electric motor. The brush holder 102 comprises a central opening 125.

The person skilled in the art will understand that in the course of assembling an electric motor, a rotor is inserted into a stator housing such that a commutator of the rotor extends from the stator housing. In the description the terms "top" or "above" indicate the direction into which the commutator points in relation to the not shown coils of the rotor. The terms "bottom" or "below" indicate the direction that is opposite to the commutator in relation to the rotor axis.

Once the not shown rotor is inserted into the stator housing the brush holding device 1 is inserted with its central opening 125 onto the not shown commutator of the not shown rotor and is locked to the not shown stator housing. In this way the not shown carbon brushes sit closely on the commutator. A carbon lead 123, 124 is attached to each carbon brush. The carbon leads are guided to the choke coil holding tube portions 121*a*, 121*b* on the upper side of the brush holder 102 for connection to the respective brush via corresponding choke coil. The carbon leads 123, 124 are connected to a first and a second contact tab 171, 172 of a first plug contact element 131 and a second plug contact element 132 which extend from the plug 103 in direction to the choke coil holding tube portions 121*a*, 121*b*.

In fact, the brush holding device 101 is assembled of separate parts in a number of assembly steps, which will be shown and explained step by step in the following. FIG. 13 shows a first assembly step of the plug 103. With respect to FIG. 12 the plug 103 is depicted in FIG. 13 upside down.

The plug 103 comprises of a plug housing 136, which is an injection-moulded part made of plastic. The plug housing 136 comprises channels to accommodate plug contact elements. In at least an embodiment of the invention there are five channels to accommodate a first plug contact element 131, a second plug contact element 132, a third plug contact element 133, a fourth plug contact element 134 and a fifth plug contact element 135. The person skilled in the art will appreciate that the number of plug contact elements 131, 132, 133, 314, 135 may vary depending on the individual design requirements and that the number of five plug contact elements is just an example. The channels are designed that the plug contact elements 131, 132, 133, 134, 135 are electrically isolated in respect to each other and do not touch each other.

In the embodiment of FIGS. 12-13, the first plug contact element 131, the second plug contact element 132, the third plug contact element 133, the fourth plug contact element 134 and the fifth plug contact element 135 are stamped from metallic sheet and are bent into appropriate forms.

The plug contact element 131, 132, 133, 134, 135 comprises two end parts, with a first end part forming a lug and a second end part forming a contact tab connected mechanically as well as electrically. In at least an embodiment of the invention the plug contact elements consist of a single piece. The person skilled in the art will appreciate that the plug contact element may also be assembled from separate pieces.

The lugs of the plug contact elements 131, 132, 133, 134, 135 are placed inside the plug housing 136 and therefore are not visible in any of the figures. The lugs are provided to connect to female parts of a not shown counter plug. By means of the not shown counter plug the electric motor is supplied with a positive and a negative supply voltage, ground level and with two signal wires.

The first plug contact element 131 is provided to supply a first carbon brush with a positive supply voltage. In the assembled state of the brush holding device 101, the first contact tab 171 protrudes from the plug housing 136 and extends towards the brush holder 102. The first contact tab 171 is bent two times such that in the assembled state of the brush holding device 101 the first contact tab 171 surrounds the central opening 125 clockwise so that the first contact tab 171 reaches or almost reaches the first to the choke coil holding tube portion 121*a*.

The plug contact element 132 is provided to supply the second carbon brush with a negative supply voltage. In the assembled state of the brush holding device 101, the second contact tab 172 protrudes from the plug housing 136 and extends towards the brush holder 202. The second contact tab 171 is bent two times such that in the assembled state of the brush holding device 201 the second contact tab 172 surrounds the central opening 225 counter-clockwise so that the second contact tab 172 reaches or almost reaches the second the choke coil holding tube portions 221*b*. After the assembly of the plug 103 to the brush holding plate 102 the first contact tab 171 is soldered or welded to the first carbon lead 123 and the second contact tab 172 is soldered or welded to the second carbon lead 124.

The person skilled in the art appreciates that the first contact tab 171 and the second contact tab 172 may be bent differently. The first contact tab 171 and the second contact tab 172 for example also may be curved to achieve their purpose.

After the plug contact elements 131, 132, 133, 134, 135 have been inserted in the assembly step into the plug housing 136 a sheet-metal grounding plate 106 is inserted into guiding grooves (not visible in any of the figures) of the plug housing 136.

The skilled person will understand that the assembly process of the brush holding device 101 described with reference to FIGS. 13 and 13 is similar to an assembly process of the brush holding device 1.

Figure 14:
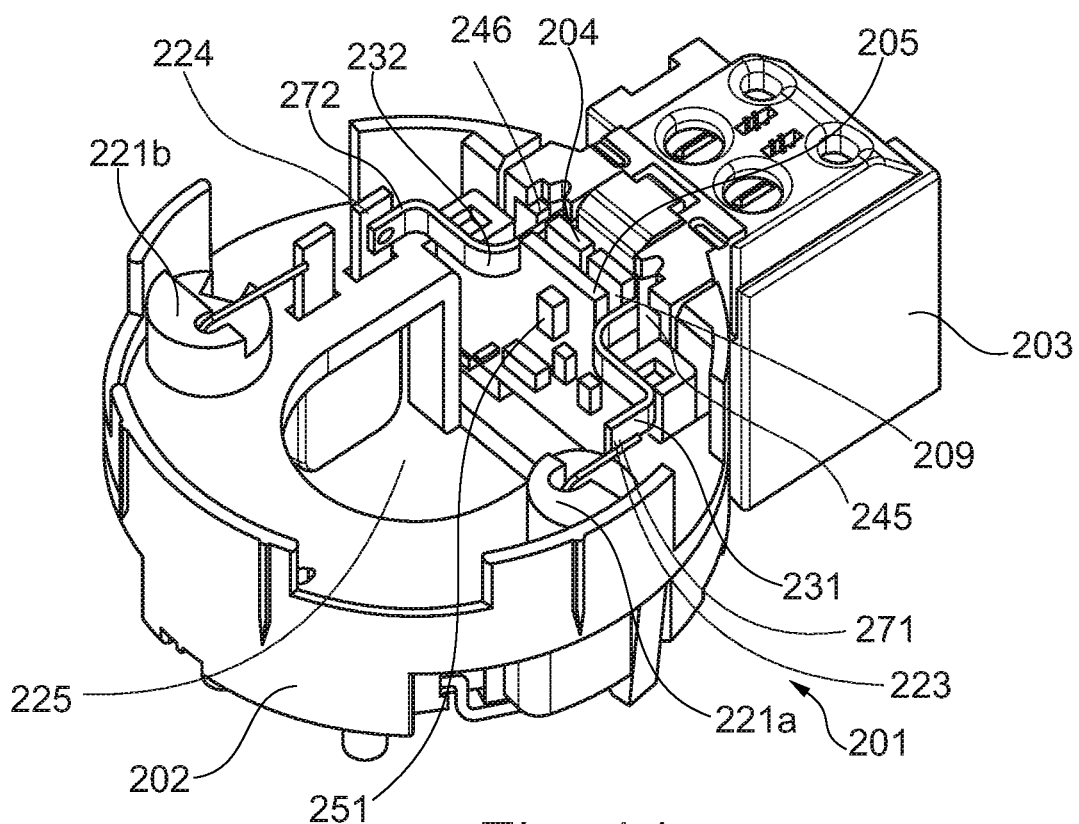
FIG. 14 is an isometric view of a brush holding device according to at least an embodiment of the present invention.

FIG. 14 is an isometric view of an isometric view of a brush holding device 201 according to at least an embodiment of the present invention. The brush holding device 201 is similar to the brush holding devices 1 and 101. The brush holding device 201 mainly differs from the brush holding device 1 and 101 essentially by a second circuit board 205.

The brush holder 202 comprises two cylindrical choke coil holding tube portions 221*a* and 221*b* to hold a choke coil, respectively. Each choke coil is connected to a respective brush, usually inserted in a corresponding brush tube arranged in proximity to the choke coil. Commonly DC electro motors use two brushes, however DC electro motors with more than two brushes also exist. The carbon brushes are not visible in the perspective view of FIG. 14 as they are inserted into the two brush tubes from the bottom side of the brush holder 202.

The plug 203 extends radially outward from the brush holder 202. A first plug contact element 231 and a second plug contact element 232 are fixed to the plug 203 and extend toward the brush holder 202. The first plug contact element 231 and the second plug contact element 232 are made of an electrically conductive material, typically metallic inserts, and are adapted to supply electric power to a brush.

The first plug contact element 231 has a first contact tab 271 and the second plug contact element 232 has a second contact tab 272, which are adapted to be welded or soldered to a first carbon lead 223 and a second carbon lead 224.

A first circuit board (also referred to as EMI suppression board) 204 identical to the first circuit board 4 as previously described and having electric-magnetic interference suppression components is inserted into the first plug contact element 231 and the second plug contact element 232. The first circuit board 204 has as the first circuit board 4 a first contact area and a second contact area. The first contact area has a first slit and the second contact area has a second slit, adapted to accommodate the first plug contact element 231 and the second plug contact element 232 respectively.

The first circuit board 204 has a plate shape extending in an axial direction, and the second circuit board 205 has a plate shape extending in the axial direction. The second circuit board 205 is adapted to be located radially inside with respect to the first circuit board 204.

The second circuit board 205 has a magnetic pole sensor 251 that detects a magnetic pole of the sensor magnet. The second printed circuit board 205 provides a hall sensor 251 for detecting a rotating magnetic field. Due to its function the second printed circuit board 205 in the following is termed sensor board 205.

Figure 15:
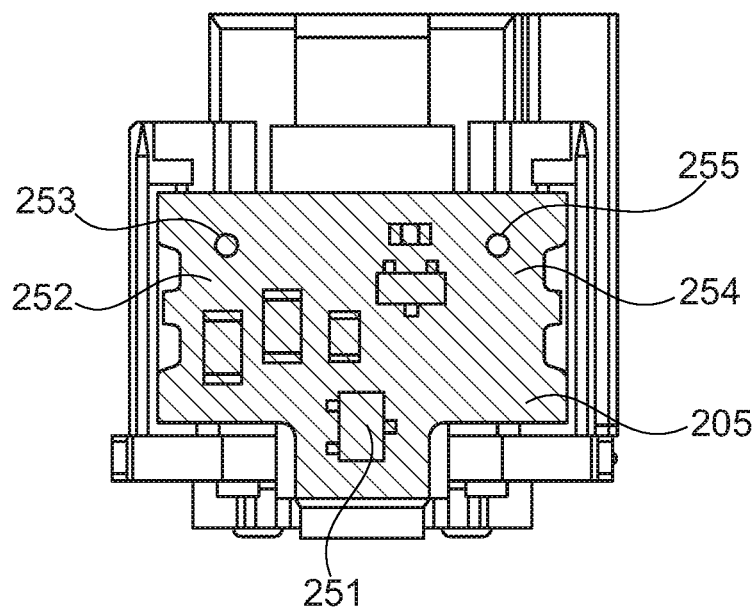
FIG. 15 is a front view of the brush holding device of FIG. 12.

As shown on FIG. 15, the sensor board 205 has a third contact area 252 and a fourth contact area 254. A first drill hole 253 is drilled through the third contact area 252 and a second drill-hole 255 is drilled through the fourth contact area 254.

A third plug contact element 233 and a fourth plug contact element (not visible) are also fixed to the plug 203 and extend toward the brush holder 202. The third plug contact element 233 is electrically connected with the first drill hole 253 and a fourth plug contact element is electrically connected with the second drill hole (not visible on FIG. 14) by soldering or welding. Hence, the third and fourth plug contact elements 233, 234 may read the output of the magnetic pole sensor 251 and thus detect the rotation angle of a rotor.

Hence, a distance between the first drill holes 253 and the second drill hole 255 matches approximately a distance between contact tabs of the third plug contact element 233 and a fourth plug contact element.

The person skilled in the art will appreciate that the second printed circuit board alternatively or supplementary may provide other sensors such as a temperature sensor or other electronic components for other purposes and may provide therefore more than two further contact areas.

Figure 16:
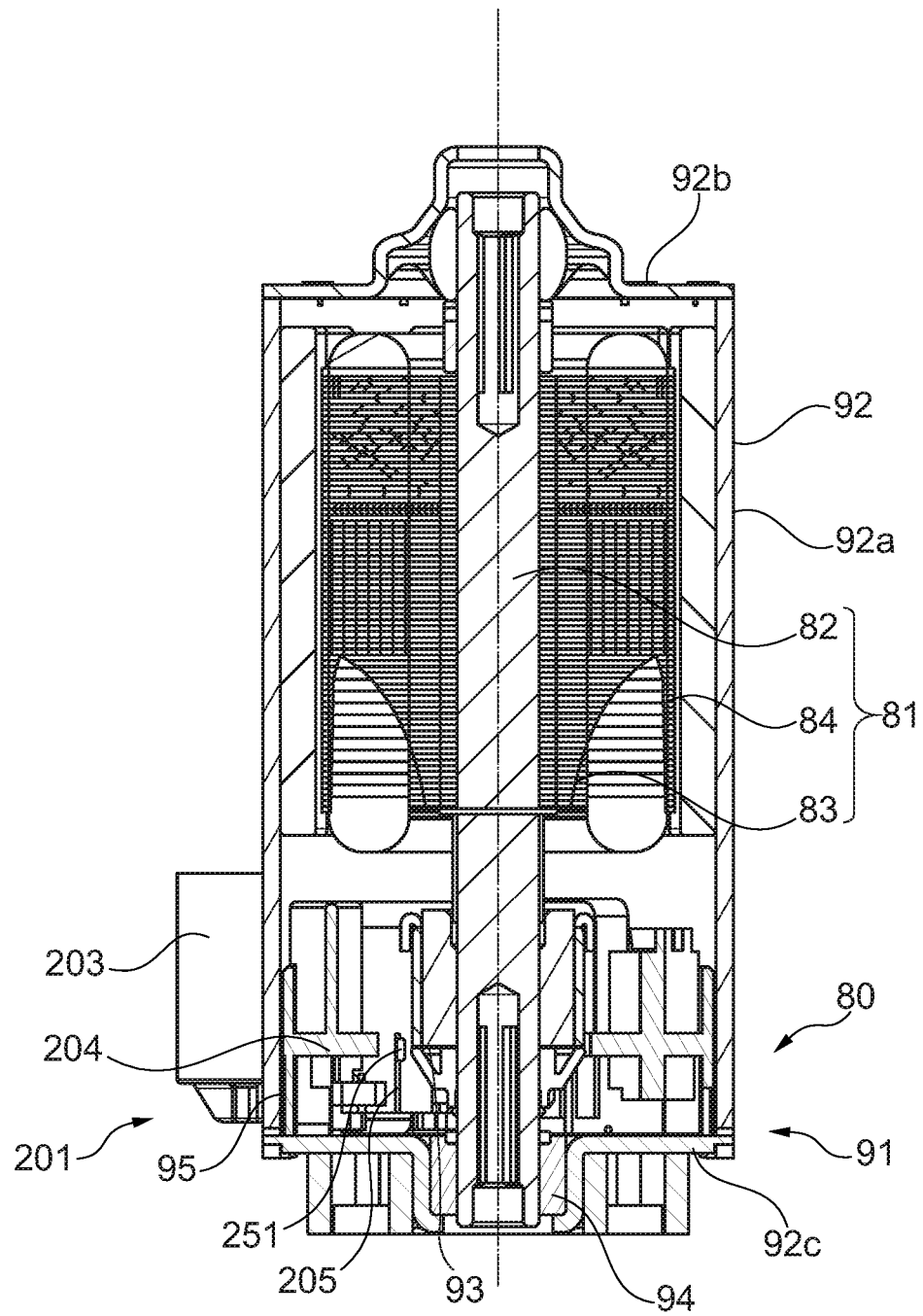
FIG. 16 is a cross-sectional view of a motor according to at least an embodiment of the present invention.
Figure 17:
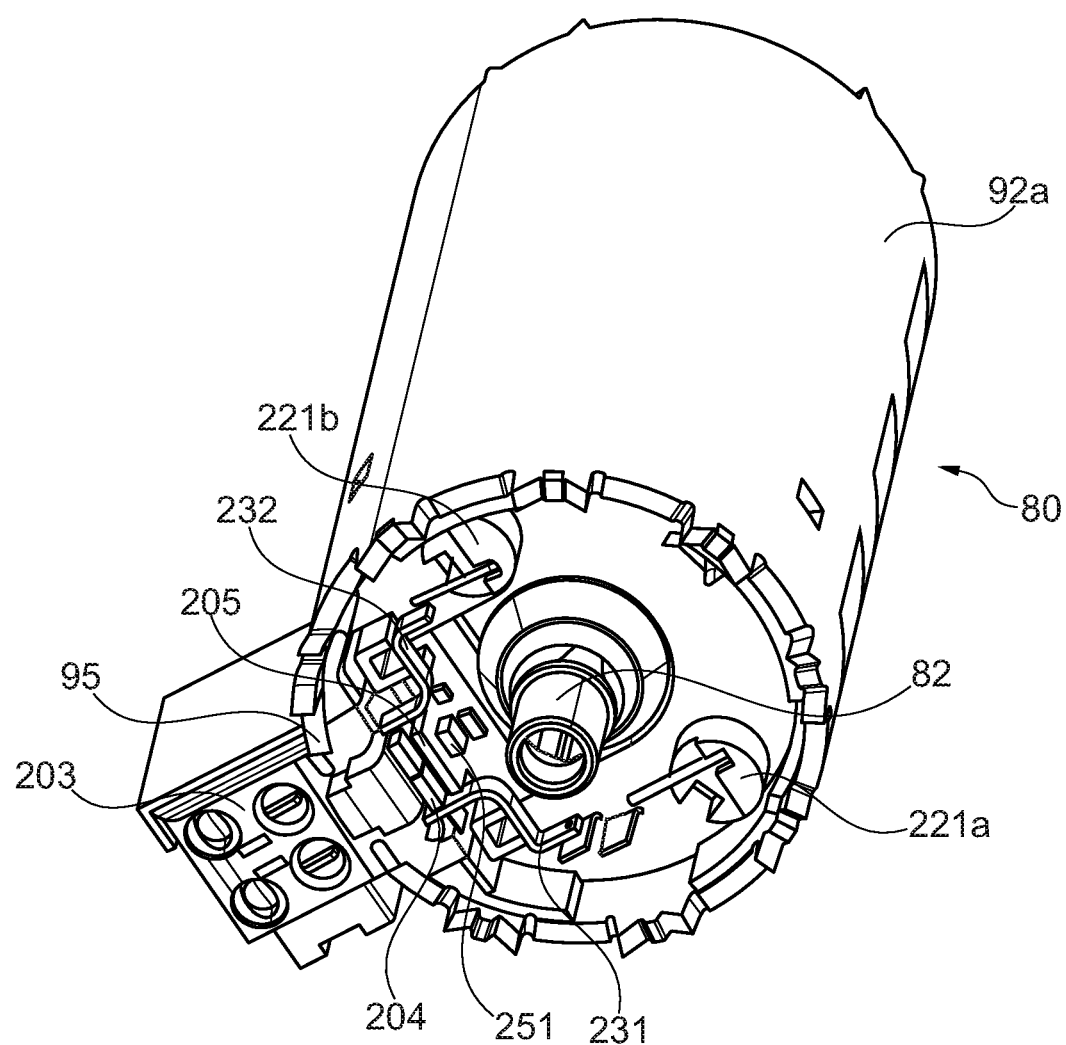
FIG. 17 is a view of the motor of FIG. 14 according to at least an embodiment of the present invention.

FIG. 16 shows a cross-sectional view of a motor 80 according to at least an embodiment of the present invention, and FIG. 17 is a perspective view of said motor 80 according to at least an embodiment of the present invention.

The motor 80 comprises a rotating section 81 and a stationary section 91. The rotating section 81 has a shaft 82, a rotor core 83 fixed to the shaft, and a coil 84 wound around the rotor core 84.

The motor has a brush holding device which, in the embodiment of FIGS. 15 and 16, is identical to the brush holding device 201 of FIGS. 12-13. In the following, reference is made to the brush holding device 201.

The stationary section 91 has the brush holding device 201, a housing 92 covering a portion of the brush holding device, a magnet 93 fixed to a housing 92 inside, and a bearing 94 that is retained in the housing and supports the shaft 82.

The housing 92 has a cylindrical portion 92a, a lid portion 92b, and a bottom portion 92c. The cylindrical portion 92a, the bottom portion 92b, and the lid portion 92c may be formed of a plurality of members or may be formed of a single member.

The cylindrical portion 92a of the housing has a through-hole 95 penetrating in a radial direction. The plug 203 is exposed to the outside through the through-hole 95. Ends in an axial direction of the brush holder are covered by the lid portion 92b and the bottom portion 92c of the housing (best seen on FIG. 16).

The first circuit board 204 is retained by the brush holding device 201, and extends in the axial direction along the cylindrical portion 92a of the housing. The first circuit board 204 and the second circuit board 205 both have a plate shape and extend in the axial direction.

The second circuit board 205 is located radially inside the first circuit board 204 and the magnetic pole sensor 251 of the second circuit board 205 faces the sensor magnet 93 in a radial direction.

The stationary section 91 further has a third plug contact element 233 and a fourth plug contact element extending toward the brush holder 202 and are electrically connected with the drill holes 253, 255 by soldering or welding. Hence, the third and fourth plug contact elements may read the output of the magnetic pole sensor 251 and thus detect the rotation angle of a rotor.

A fifth plug contact element may be provided as well.

The third plug contact element 233 and the fourth plug contact element pass through fourth and fifth slits of the first circuit board 204.

Figure 18:
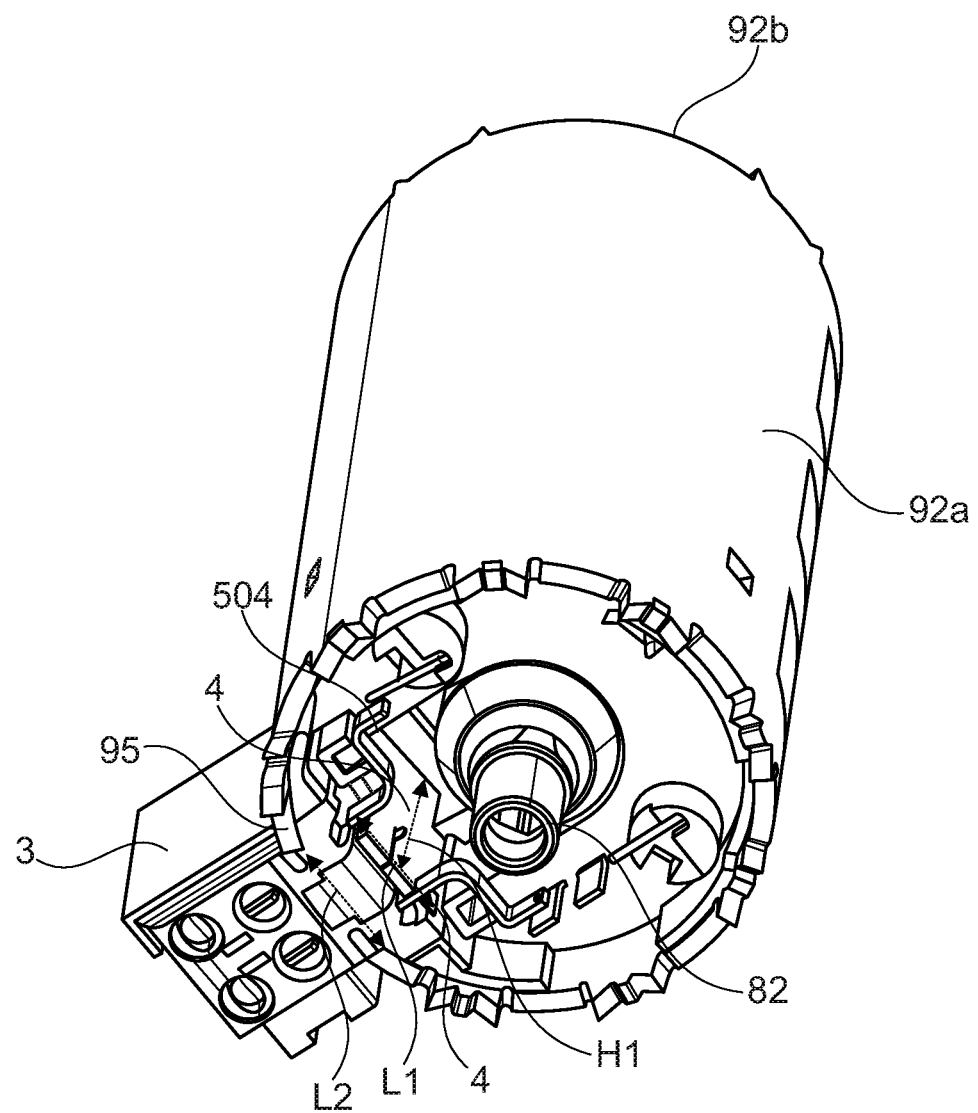
FIG. 18 is a view of a motor according to at least an embodiment of the present invention
Figure 19:
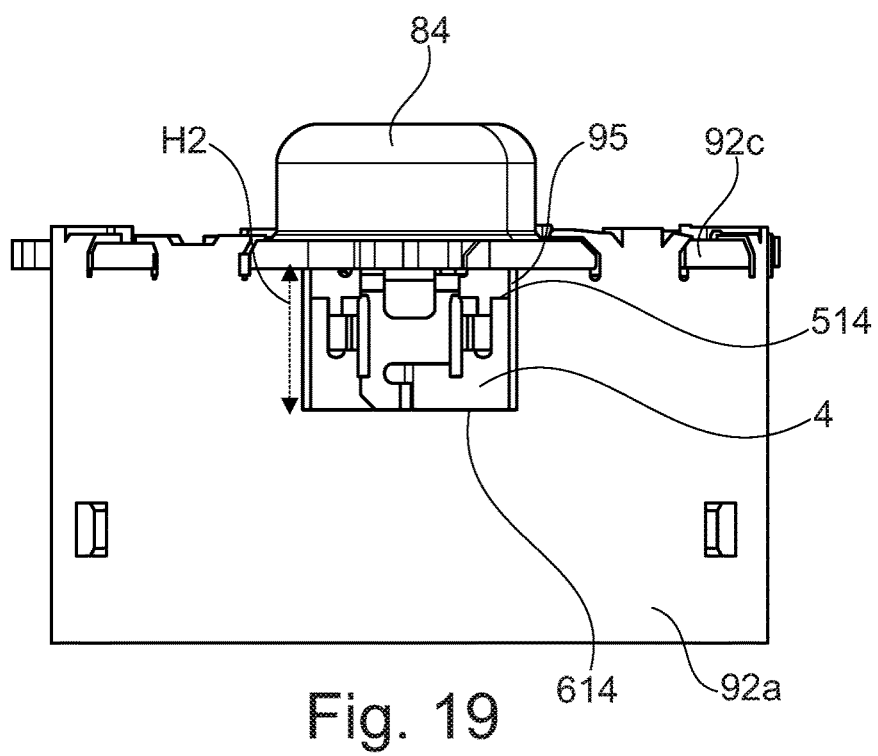
FIG. 19 is a detailed view of the brush holding device mounted to a through hole of a motor housing of the motor of FIG. 18.
Figure 20:
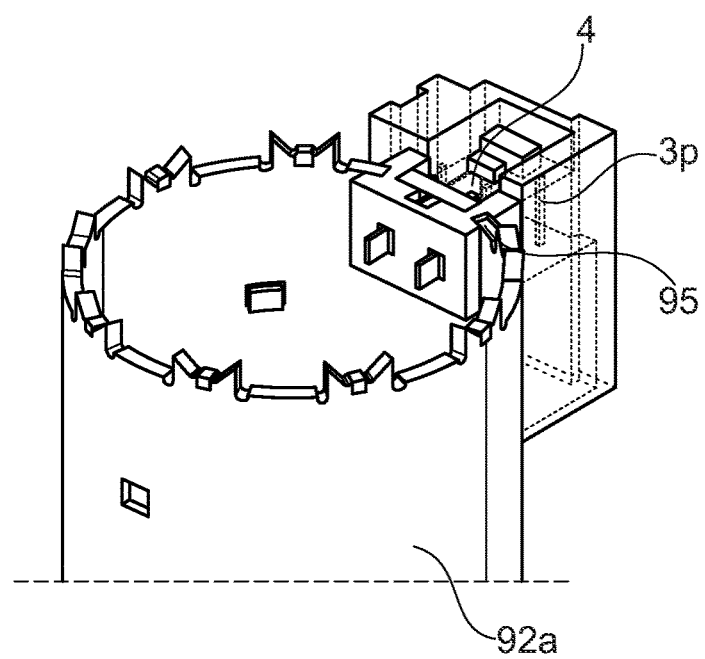
FIG. 20 is another view of the brush holding device mounted to a through hole of a motor housing of the motor of FIG. 18

FIG. 18 is a perspective view of a motor 180 according to at least an embodiment of the present invention and FIG. 19 a detailed view of the brush holding device mounted to a through hole of the motor housing of the motor of FIG. 18. FIG. 20 is another view of the brush holding device mounted to a through hole of the motor housing of the motor of FIG. 18.

The motor 180 differs essentially from the motor 80 by the brush holding device mounted thereto.

The motor 180 comprises a rotating section 81 and a stationary section 91, similar to the rotating section and stationary section of the motor 80. Reference is therefore made to FIG. 16 showing the rotating section 81 with a shaft 82, a rotor core 83 fixed to the shaft, and a coil 84 wound around the rotor core 84.

A brush holding device is provided, which is identical to the brush holding device 1 of FIGS. 1-10. In the following, reference is made to the brush holding device 1. Reference is therefore made to FIG. 16 showing the housing 92 with a cylindrical portion 92a, a lid portion 92b, and a bottom portion 92c.

The cylindrical portion 92a, the bottom portion 92b, and the lid portion 92c may be formed of a plurality of members or may be formed of a single member.

The cylindrical portion 92a of the housing has a through-hole 95 penetrating in a radial direction. The plug 3 is exposed to the outside through the through-hole 95, and ends in an axial direction of the brush holder are covered by the lid portion 92b and the bottom portion 92c of the housing.

The stationary section 91 has the brush holding device 1, the housing 92, a magnet 93 fixed to a housing 92 inside, and a bearing 94 that is retained in the housing and supporting the shaft 82.

The through-hole 95 and the first circuit board 4 overlap in the radial direction.

The first circuit board 4 has an upper end 514 which is located further on the upper side in the axial direction than a lower end 614 of the through-hole 95. The first circuit board 4 has a height dimension HI in the axial direction of the first circuit board 4 which is larger than a height dimension H2 in the axial direction of the through-hole 95 of the housing. The first circuit board 4 further has a width dimension LI in a circumferential direction of the first circuit board 4 which is larger than a width dimension L2 in the circumferential direction of the through-hole 95. In other words, the first circuit board 4 can therefore close the opening formed by the through hole 95 of the housing.

The first circuit board 4 is located inside the cylindrical portion of the housing. The first circuit board 4 is located radially outside the brush holder.

Alternately, the first circuit board may be located radially inside the brush holder.

The first circuit board 4, which is retained by the brush holding device 1, extends substantially vertically and in a radial direction along the cylindrical portion of the housing The stationary section 91 has a plug member 3p, fixed to the housing 92 and overlaps the through-hole 95 of the housing in the radial direction, as best seen on FIG. 20.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A brush holding device comprising:
    a brush holder;
    a plug extending radially outward from the brush holder;
    a first plug contact element and a second plug contact element that are fixed to the plug and extend toward the brush holder; and
    a first circuit board having a first contact area and a second contact area, wherein the first plug contact element and the second plug contact element are connected with a brush through a choke coil,
    wherein the first plug contact element and the second plug contact element are made of an electrically conductive material and supply electric power to the brush,
    wherein the first contact area comprises a first slit,
    wherein the second contact area comprises a second slit,
    wherein the first circuit board is inserted into the first plug contact element and the second plug contact element,
    wherein the first plug contact element and the second plug contact element are respectively accommodated in the first slit and the second slit, wherein the first contact area and the second contact area are electrically connected to the first plug contact element and the second plug contact element by solder or welding,
    wherein the first circuit board comprises electric-magnetic interference suppression components,
    wherein the electric-magnetic interference suppression components are electrically connected to the first contact area and the second contact area, and
    wherein the electric-magnetic interference suppression components are directly or indirectly grounded;
    wherein the first slit and the second slit are provided in an edge of the circuit board.

2. The brush holding device according to claim 1,
    wherein a width of the first slit and a width of the second slit, each, is bigger than a thickness of the first plug contact element and a thickness of the second plug contact element, each, and
    wherein the first plug contact element and the second plug contact element are respectively fixed to the first slit and the second slit.

3. The brush holding device according to claim 1, wherein the first circuit board comprises a plate shape,
    the first circuit board extends perpendicular to the brush holder and in an axial direction, and
    the first slit and the second slit are located at end portions in the axial direction of the first circuit board.

4. The brush holding device according to claim 3,
    wherein the first slit and the second slit each comprises a shape obtained from cutting out a lower end portion of the first circuit board.

5. The brush holding device according to claim 1, wherein the first contact area comprises a first land portion that is formed of copper foil, the first land portion surrounds the first slit,
    the second contact area comprises a second land portion that is formed of copper foil, and the second land portion surrounds the second slit.

6. The brush holding device according to claim 1, wherein the plug comprises a circuit board accommodation portion, and
    the circuit board accommodation portion extends in the axial direction from the plug and surrounds an edge of the first circuit board.

7. The brush holding device according to claim 6,
    wherein the circuit board accommodation portion extends in a circumferential direction while facing upward axially.

8. The brush holding device according to claim 1, wherein the first plug contact element comprises a first press-fitting portion,
    the second plug contact element comprises a second press-fitting portion, and the first press-fitting portion and the second press-fitting portion are press-fitted fixed to the plug.

9. The brush holding device according to claim 1, further comprising: a member for ground, wherein
    the member for ground is located on a lower surface of the plug,
    the first circuit board comprises a third slit and a third land portion,
    the member for ground comprises a conduction portion that is electrically connected with the third land portion by solder or welding, and
    the first land portion, the second land portion, and the third land portion are respectively electrically connected.

10. The brush holding device according to claim 1, further comprising: a member for ground,
    the member for ground is located on an upper surface of the plug,
    the first circuit board comprises a third slit and a third land portion,
    the member for ground comprises a conduction portion that is electrically connected with the third land portion by solder or welding, and the first land portion, the second land portion, and the third land portion are respectively electrically connected.

11. A brush holding device comprising:
- a brush holder;
- a plug extending radially outward from the brush holder;
- a first plug contact element and a second plug contact element that are fixed to the plug and extend toward the brush holder; and
- a first circuit board having a first contact area and a second contact area, wherein the first plug contact element and the second plug contact element are connected with a brush through a choke coil, wherein the first plug contact element and the second plug contact element are made of an electrically conductive material and supply electric power to the brush, wherein the first contact area comprises a first slit, wherein the second contact area comprises a second slit, wherein the first circuit board is inserted into the first plug contact element and the second plug contact element, wherein the first plug contact element and the second plug contact element are respectively accommodated in the first slit and the second slit, wherein the first contact area and the second contact area are electrically connected to the first plug contact element and the second plug contact element by solder or welding, wherein the first circuit board comprises electric-magnetic interference suppression components, wherein the electric-magnetic interference suppression components are electrically connected to the first contact area and the second contact area, and wherein the electric-magnetic interference suppression components are directly or indirectly grounded;

wherein the first slit is provided in a first edge of the circuit board and the second slit is provided in a second edge of the circuit board.

* * * * *